United States Patent
Joly et al.

(10) Patent No.: US 10,634,158 B2
(45) Date of Patent: Apr. 28, 2020

(54) BLADE WITH A PLATFORM AND A HOLLOW BUMPER

(71) Applicant: Safran Aircraft Engines, Paris (FR)

(72) Inventors: Philippe Gérard Edmond Joly, Moissy Cramayel (FR); Damien Merlot, Moissy Cramayel (FR); Jean-Marc Claude Perrollaz, Moissy Cramayel (FR)

(73) Assignee: Safran Aircraft Engines, Paris (FR)

( * ) Notice: Subject to any disclaimer, the term of this patent is extended or adjusted under 35 U.S.C. 154(b) by 309 days.

(21) Appl. No.: 15/507,116

(22) PCT Filed: Sep. 3, 2015

(86) PCT No.: PCT/FR2015/052337
§ 371 (c)(1),
(2) Date: Feb. 27, 2017

(87) PCT Pub. No.: WO2016/034822
PCT Pub. Date: Mar. 10, 2016

(65) Prior Publication Data
US 2017/0276145 A1 Sep. 28, 2017

(30) Foreign Application Priority Data
Sep. 4, 2014 (FR) ..................... 14 58280

(51) Int. Cl.
*F01D 5/14* (2006.01)
*F04D 29/32* (2006.01)
(Continued)

(52) U.S. Cl.
CPC .......... *F04D 29/324* (2013.01); *F01D 5/141* (2013.01); *F01D 5/143* (2013.01); *F01D 11/006* (2013.01);
(Continued)

(58) Field of Classification Search
CPC .......... F05D 2240/80; F05D 2260/941; Y02T 50/673; F01D 5/22; F01D 11/006;
(Continued)

(56) References Cited

U.S. PATENT DOCUMENTS

| 3,056,578 | A | * | 10/1962 | Auger | F01D 5/06 |
| | | | | | 416/201 R |
| 4,743,166 | A | * | 5/1988 | Elston, III | F01D 5/3038 |
| | | | | | 416/193 A |
| 4,872,812 | A | * | 10/1989 | Hendley | F01D 5/22 |
| | | | | | 416/190 |
| 5,443,365 | A | | 8/1995 | Ingling et al. | |

(Continued)

FOREIGN PATENT DOCUMENTS

| CA | 2951795 A1 * | 6/2017 | F04D 29/023 |
| EP | 1617044 A1 | 1/2006 | |
| EP | 1749968 A2 | 2/2007 | |

*Primary Examiner* — George C Jin
*Assistant Examiner* — Teuta B Holbrook
(74) *Attorney, Agent, or Firm* — Blank Rome LLP

(57) ABSTRACT

The invention relates to a blade, the platform (14) of which has at least one bumper (40) which rises, on the inner face, from a connection to an intermediate area of the blade located along a longitudinal axis of the blade, between the blade root and the outer face (143), towards a free side edge (145) of the platform. The platform bumper (40) locally has a thinned portion at a distance from said free side edge of the platform.
The invention is applicable to turboshaft engine fans.

10 Claims, 3 Drawing Sheets

Figure 1:
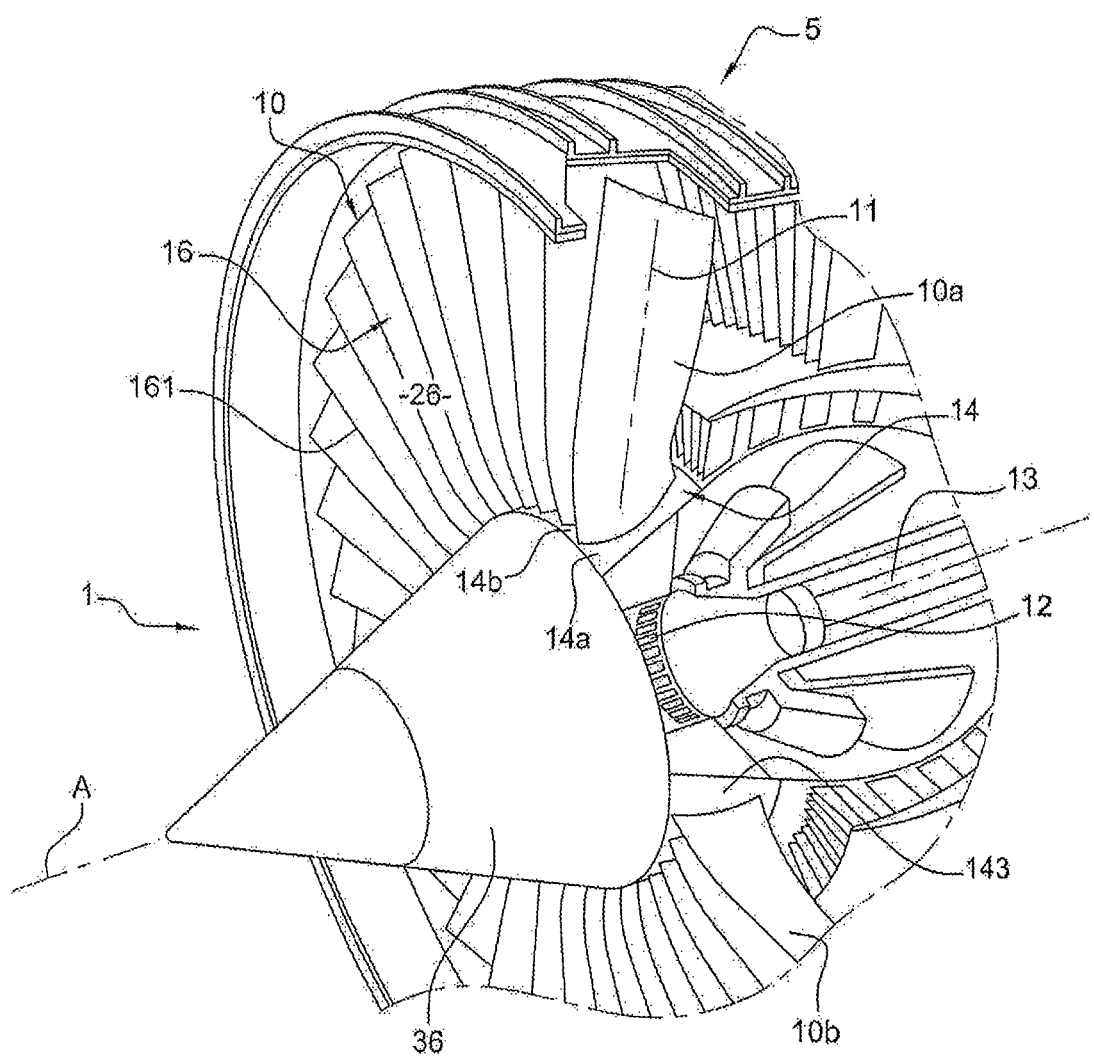

(51) Int. Cl.
_F01D 11/00_     (2006.01)
_F01D 21/04_     (2006.01)
_F01D 5/30_          (2006.01)

(52) U.S. Cl.
CPC .......... _F01D 21/045_ (2013.01); _F01D 5/3007_ (2013.01); _F05D 2220/36_ (2013.01); _F05D 2240/80_ (2013.01); _F05D 2250/73_ (2013.01); _F05D 2260/94_ (2013.01); _Y02T 50/673_ (2013.01)

(58) Field of Classification Search
CPC .......... F01D 5/141; F01D 5/143; F04D 29/38; F04D 29/321; F04D 29/668
See application file for complete search history.

(56)          References Cited

U.S. PATENT DOCUMENTS

| | | | |
|---|---|---|---|
| 2007/0031259 A1* | 2/2007 | Dube | F01D 5/147 416/193 A |
| 2011/0158811 A1 | 6/2011 | Morrison | |
| 2014/0072436 A1* | 3/2014 | Thomen | F01D 5/147 416/219 R |
| 2014/0150454 A1* | 6/2014 | Faulder | F01D 5/141 60/805 |
| 2015/0192027 A1* | 7/2015 | Paige | F01D 5/282 416/174 |
| 2015/0198048 A1* | 7/2015 | Handler | F01D 5/147 416/95 |
| 2016/0273367 A1* | 9/2016 | Lana | F01D 5/26 |
| 2017/0074281 A1* | 3/2017 | Li | F01D 5/14 |

* cited by examiner

BLADE WITH A PLATFORM AND A HOLLOW BUMPER

The invention relates to a blade for a turbomachine, such as in particular an airplane turbojet or turboprop, as well as a fan rotor and a turbomachine provided therewith.

Typically, a fan rotor, or more generally a turbomachine rotor comprises a disk the outer periphery of which carries blades, the roots of which are engaged into grooves on the outer periphery of the disk, with such grooves being substantially axial (i.e. substantially parallel to the axis of rotation of the rotor). Typically, the blades are radially held on the disk since the shape of their roots fits that of the grooves of the disk, with the blade roots being for example dovetail-shaped.

Blade loss may occur. At least a part of the blade then detaches from the rotor disk.

Typically, a turbomachine blade comprises a vane having a leading edge and a trailing edge, a blade root and a platform interposed between the vane and the blade root, along a longitudinal axis of the blade, with the platform having an inner face on the blade root side and an outer face on the vane side.

In particular to prevent overlapping of the platforms especially in case of blade(s) loss, (at least) one platform bumper rises on the inside, from a connection to an intermediate area of the blade located along a longitudinal axis of the blade, between the blade root and the outer face, towards a free side edge of the platform.

On any given blade, such bumpers block the adjacent blade thus preventing overlapping. Besides, significant stresses resulting from the impact on the detached or broken adjacent blade are then typically transferred directly by these bumpers (which then operate under compression).

Furthermore, still in case of a blade loss, the platform of the detached blade has to break not to damage the adjacent blade. The above-mentioned bumpers preventing any overlapping on the adjacent blade must not break, however so as to avoid, then again, the overlapping of platforms and the breaking of the adjacent blade at the back bending which typically occurs in response after the blade has bent because of the impact.

A solution is proposed here to ensure both:

an easier, localized breaking of the platform, for the case where the blade involved would be the "detached blade",
and, in case of transfer of stresses, a compressive strength of the bumper, or of each bumper, and the prevention of overlapping for the case where the blade involved would be the "adjacent blade".

For this purpose, it is proposed that the bumper or each platform bumper should locally have, parallel to a direction connecting said leading and trailing edges of the blade, a thinned portion located away from said free side edge of this platform.

Thus, in case of a side impact, with a detached blade thus coming from aside, the blade provided with such thinned portion will still have a high compressive strength. As for the detached blade, the thus positioned thinned portion thereof will form, closer to the above-mentioned area of connection of the bumper (and more generally of the platform) with the rest of the blade, a weakened area facilitating a localized breaking of the platform, typically along a line generally oriented in a direction connecting the leading and trailing edges of the vane of such blade.

In this connection, it is also advisable that the thinned portion should be located towards the connection of the platform bumper to said intermediate area of the blade, i.e. in the immediate vicinity of such connection.

For a good understanding, it is now explained that such "intermediate area" of the blade will here be typically defined by the stilt area, which, on such an equipped blade, extends between the blade and the blade root, along the longitudinal axis of the blade, with the blade being the essential part which interacts with the air flow, with the root being the part fixing the blade to the disk which carries it, as explained above.

And to favour a detachment of the platform that avoids keeping a bumper which might entail damages to the adjacent blade, on the concerned blade, while ensuring the best resistance to a side impact, it is even recommended that the thinned portion should extend up to the connection to said intermediate area of the blade.

Preferably, along the length of the considered bumper, thus between the connection to said intermediate area of the blade and the free side edge opposite the platform, along the free end of the bumper (including the thinned portion), up to which the latter rises on the platform, from the inner face, the length of the thinned portion will preferably range from ⅓ to ⅔ that of the bumper.

Thus, the platform will break even if the breaking line slightly laterally deviates, with the gap making it possible to preserve the anti-overlapping and the compressive strength on the side.

To favour an optimal breaking line of the platform too, by pre-setting a portion of its path, it is recommended:

that the bumper should have an upstream face oriented towards the leading edge and a downstream face oriented towards the trailing edge, and transversely to the longitudinal axis of the blade and to said direction connecting the leading edge and the trailing edge;

that the thinned portion should define a recess in one of said faces, and, that the recess should have a concave surface in several directions.

Consequently, the minimum thickness of the thinned portion will then be located at the bottom of such concave surface in several directions, since the various directions of concavity will advantageously join at such bottom, where the thickness is at a minimum.

Given the orientation of each blade mounted on the disk and the motion thereof if it comes off, it is recommended, moreover, that the thinned portion should define a recess in the upstream face directed towards the leading edge (typically thicker than the trailing edge).

Thus, the breaking line will first meet the recess, before the downstream face, as it moves along the platform.

Given similar considerations, it is recommended:

that, in the direction of said intermediate area of the blade, on the inner face and parallel to said direction joining the leading and trailing edges of the blade (thus transversely to the longitudinal axis of the blade), the thinned portion should have a minimum thickness e1:

that, between the inner and outer faces, the platform should have a minimum thickness e2, and that the ratio of the minimum thickness e2 of the platform to the minimum thickness e1 of the thinned portion should range from 0.5 to 1.5.

And it is also recommended:

that, at a location between the connection to said intermediate area of the blade and the free side edge opposite the platform, the thinned portion and the rest of the platform bumper should respectively have a first and a second maximum thickness e3, e4, parallel to said direction connecting the leading and the trailing edges, and that said maximum thickness e3 of the thinned portion should be, at the free end of the bumper, ranging from 0.15 to 0.4 times the maximum thickness e4 of this bumper.

And for similar considerations again, it is recommended that, parallel to the longitudinal axis of the blade and substantially transversely to the direction in which the platform bumper extends from the connection to said intermediate area of the blade towards a free edge opposite the platform, the thinned portion should have a thickness which decreases from the inner face to a free end of the bumper.

In addition to the blade itself, the invention also relates to a turbomachine fan comprising a series of blades, at least some of which have all or some of the above characteristics, and to a turbomachine provided with this fan or a rotor, all the blades of which are as described above.

Figure 2:
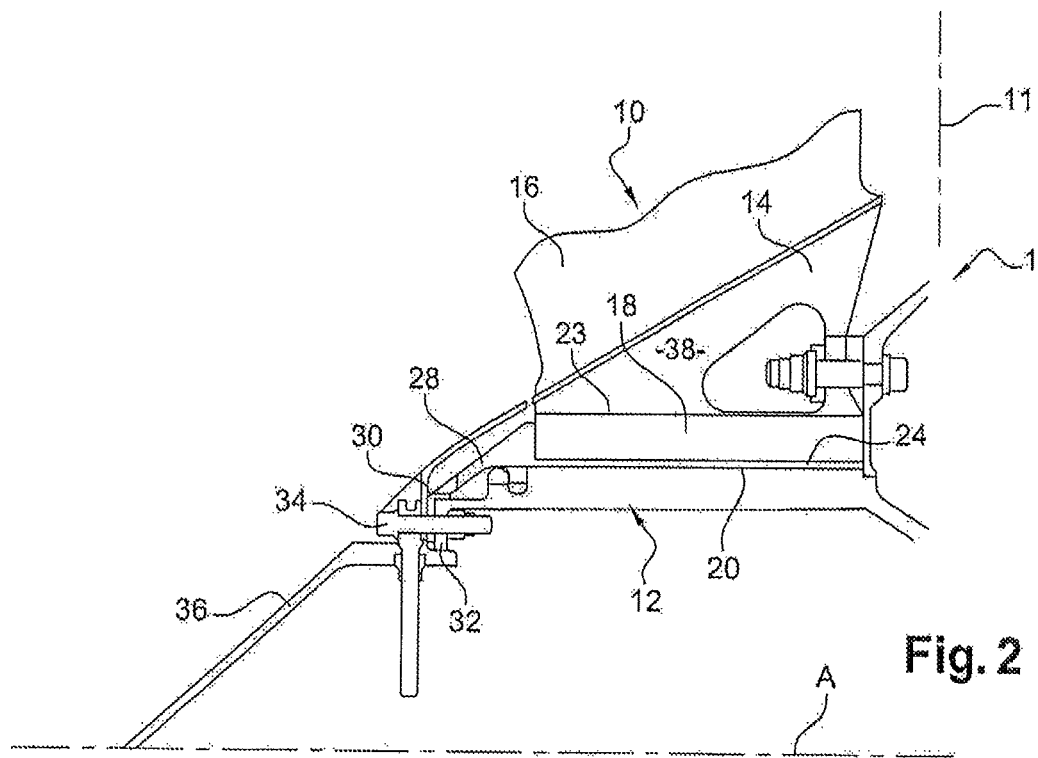
Figure 3:
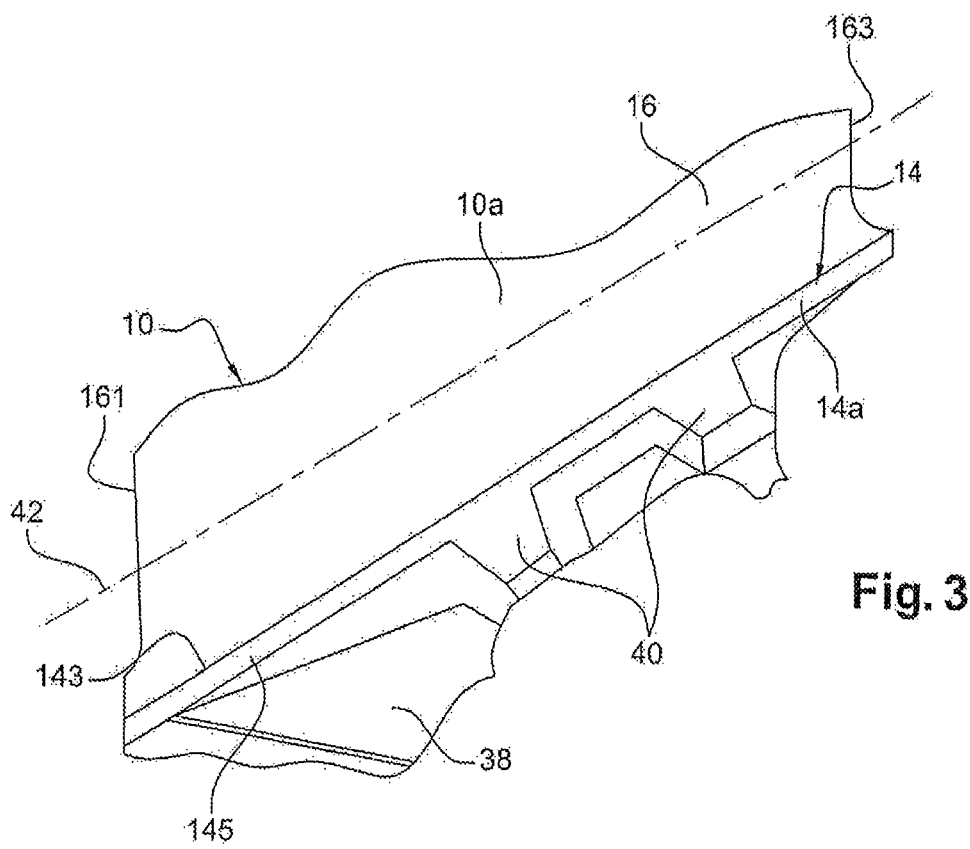
Figure 4:
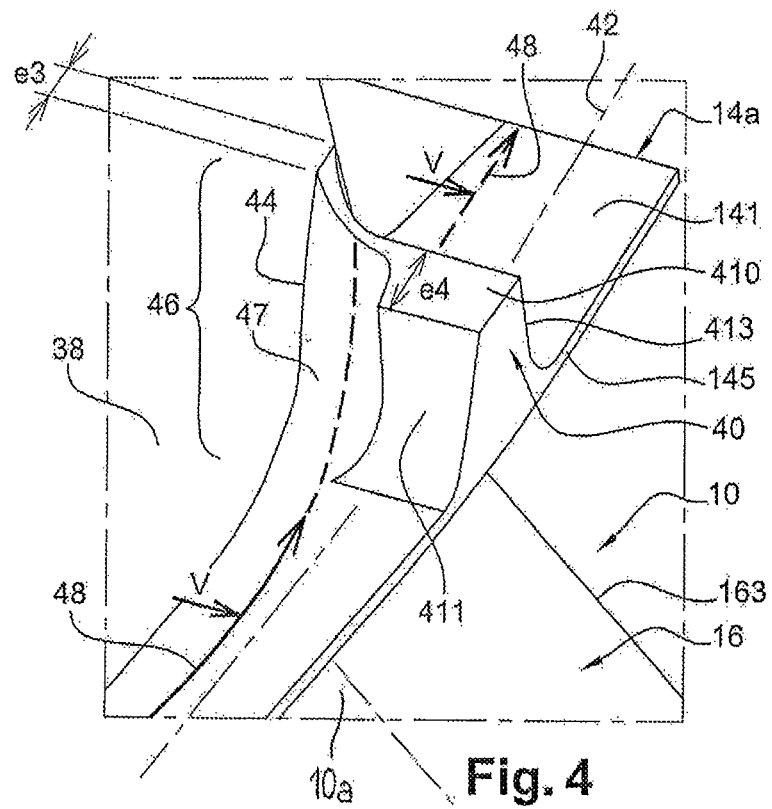
Figure 5:
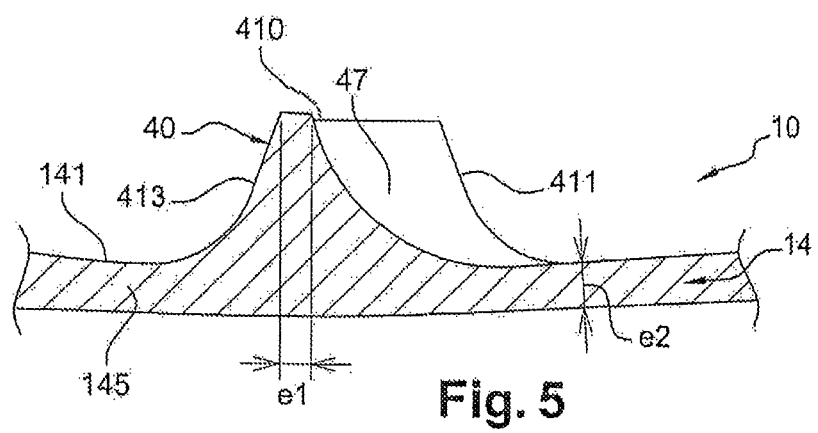

If need be, the invention will be better understood, and other details, characteristics and advantages thereof will appear upon reading the following description given by way of a non-restrictive example while referring to the appended drawings wherein:

FIG. 1 is a partial schematic view, in perspective, with a local cutaway of a turbomachine, specifically the fan thereof which may suit the invention, FIG. 2 is an axial sectional and schematic view of a part of a fan which may be that of FIG. 1, FIG. 3 is a schematic side view of a portion of the rotor blade shown on the part of the fan illustrated in FIG. 2, FIG. 4 is a schematic three-quarter view, on a larger scale, of a portion of a rotor blade too, as seen underneath, from the root thereof towards the trailing edge, and FIG. 5 schematically shows locally a detail of the area of the inner bumper of the same blade turned upside down (with the root up), along a section along the line VV in FIG. 4.

FIGS. 1 and 2 thus partially show a fan 1 of a turbomachine 5 which can receive a series of blades 10 complying with those of the present invention.

Such fan thus comprises an impeller with blades 10 carried by a disk 12 and between which the interblade platforms 14 are interposed. The disk 12, arranged around the longitudinal axis A of the turbomachine, is fixed to the upstream end of a shaft 13 of such turbomachine.

Each fan blade 10 has a blade-forming portion 16 the radially inner end of which is connected (in one piece) to a root 18 which is engaged into a substantially axial groove 20 having a shape matching that of the disk 12, typically formed between two ribs 23 of the disk 12. A shim 24 is interposed between the root 18 of each blade 10 and the bottom of the matching groove 20 of the disk 12 to radially lock the blade 10 on the disk 12.

The inter-blade platforms 14 are very schematically shown in FIGS. 1 and 2. In particular, no anti-overlap bumper is shown thereon, such as those 40 mentioned below and shown in greater details in FIGS. 3 and 4.

Such bumpers are preferably formed on both sides, respectively the backside and the front side, 14a and 14b, of the platform, i.e. 10a on the backside and the frontside 10b of the considered blade 10, respectively.

Substantially transversely to the longitudinal axis 11 of a blade, the platforms 14 form, laterally on either side of a blade, and thus between two consecutive blades, a wall which internally delimits (in a succession of directions radial to the longitudinal axis A of the turbomachine) the air flow jet 26 that enters the turbomachine. The platforms may include means cooperating with matching means provided on the disk 12 between the grooves 20, to secure the platforms on the disk. They may also be individually made in one piece with the blade they are provided on.

The fan blades 10 are axially held in the grooves 20 of the disk 12 by suitable means mounted on the disk 12, typically upstream and downstream of the blades 10.

The upstream holding means comprise an annular flange 28 coaxially fixed on the upstream end of the disk 12. The flange 28 is prevented from rotating by means of a ring 30 partly in axial abutment against a flange 32 of the disk. The flange 32 has axial holes for the passage of screws 34. The flange 74 is thus prevented from rotating by abutment of its solid portions 84 against the protrusions 90 of the ring. A cap 36 which may be tapered is fixed to the disk. Hooks may be provided downstream.

Along the axis 11, each blade 10 preferably comprises, as shown, an intermediate stilt area 38, which extends between the vane 16 and the root 18, more precisely between the platform 14 and the root 18.

The platform 14 has an inner face 141 on the blade root, and so here the stilt area, side, and an outer face 143 on the opposite side, i.e. on the blade 16 side.

FIG. 3 shows, on the lateral backside as illustrated, two bumpers 40 arranged one behind the other, along the axis 42 which defines the direction connecting the leading edge and the trailing edge of the blade.

Several bumpers 40 may thus be found on each side and along the general direction 42 which crosses the leading edge 161 and the trailing edge 163 of the blade, specifically two bumpers on the frontside and two on the backside.

Each bumper rises on the inner face141, substantially parallel to the axis 11. Across the axis 11 and 42, each bumper further extends:

from a connection 44 to an intermediate area 46 of the blade located along the axis 11 between the root 18 and the inner face 141, towards the free side edge 145 opposite the platform (FIGS. 4, 5).

Besides, each bumper will have an upstream face 411 oriented towards the leading edge 161 and a downstream face oriented towards the trailing edge 163.

It will be understood that the intermediate area 46 will typically correspond to a portion of the stilt 38 which the bumper 40 considered will be connected to.

Each connection 44 will a priori be a one-piece connection, and the blade can be produced by forging or casting (including the considered bumper 40), with rework with a tool if necessary.

To further ensure, in the event of a blade loss 10, both:

an easier, localized breaking of the platform, for the case where the blade involved would be the "detached blade", and a compressive strength of the bumper, or of each bumper, and the prevention of overlapping for the case where the blade involved would be the "adjacent blade" or even another blade of the wheel, at least some of the bumpers 40 on the platforms 14 are provided to be thinned, like those schematically shown in FIGS. 4,5.

Such thinned portion 47 of the considered bumper 40 will be located laterally at a distance from said free side edge 145, as seen in FIG. 4.

In practice, this will be provided at least and preferably only, for the lateral backside 14a of the concerned platform, since in the event of a blade loss, the adjacent blade is impacted by the backside.

Comparing FIGS. 1 and 4 makes it possible to understand that the backside 10*a* of the blade is reversed from one figure to another, to show that blades with thinned platform bumper(s) 47 could be provided on both clockwise-or anti-clockwise-rotating engines.

In particular, FIG. 4 shows that the considered bumper, or each bumper 40 extends laterally, i.e. across the axis 42 (or horizontally, with the blade 10 then being assumed to be vertical), from the free side edge 145 of the platform to the stilt area 38 with first a nominal thickness e4, then the reduced thickness, referenced e1 in FIG. 5, because of the thinned portion 47.

The thinned portion will advantageously be located towards the connection 44 of the platform bumper 40 to said area 38/46 of the blade. In other words, to favour the effects above and thus specifically a tearing on the side of the platform 14 shown in FIG. 4, along the path 48, the thinned portion 47 will be laterally closer to the connection 44 than to the free edge 145.

FIGS. 4 and 5 even show that the best effect as to the breaking/compressive strength compromise will be obtained if the thinned portion 47 extends up to the connection to said intermediate area 46/38, and is thus adjacent thereto.

For the same purpose, it is further recommended that the thinned portion 47 should define a recess in one of said upstream 411 and downstream faces, and that such recess should have a concave surface in several directions, as illustrated in FIGS. 4, 5 where the recess curves 47 show a possible geometry in this respect.

To favour the desired compromise too, it is recommended that, substantially transversely to the direction in which the bumper 40 extends (i.e. vertically, transversely to the axis 42, with the blade 10 then being assumed to be vertical), the thinned portion 47 should have a thickness which decreases from the inner face up to a free end 410 of the bumper (thickness e1 in FIG. 5) matching the surface, i.e. flat here, up to which the bumper 40 rises on the inner face 141.

As regards the free side end of the bumper 40, it will preferably be located at the edge 145, to straightaway withstand the lateral force, in the event of an impact with a detached blade.

And the thinned portion will be favorably defined by the recess 47 in the upstream face 411, so that the line 48 has a gentler slope and a reduced front resistance when and as the thinned portion of the bumper rises.

As regards the dimensions, the following is recommended too, as shown in the figures:
on the inner face 141 and parallel to the direction 48, the thinned portion should have a minimum thickness, here e1,
between the inner and outer faces, the platform 14 locally should have a minimum thickness e2 (FIG. 5),
and the ratio of the minimum thickness e2 of the platform to the minimum thickness e1 of the thinned portion should range from 0.5 to 1.5, so that the desired compromise is optimized again.
Complementary or alternative solution:
at the thinnest part of the thinned portion (i.e. at the free end 410 of the bumper in the preferred embodiment) and locally between the connection 44 and the side edge 145, the thinned portion and the platform bumper (away from this thinned portion) each have a maximum thickness (e3 and e4 respectively) parallel to said direction and,
the maximum thickness e3 of the thinned portion ranges from 0.15 to 0.4 times the maximum thickness e4 of the bumper (at a distance from such thinned portion).
The desired compromised will thus be optimized.

The invention claimed is:

1. A turbomachine blade comprising a vane having a leading edge and a trailing edge, a blade root and a platform, the platform being between the vane and the blade root, with respect to a longitudinal axis of the blade, wherein the platform has an inner face oriented towards the blade root and an outer face oriented towards the vane, the inner face having at least one bumper changes shape as it extends from a connection of said at least one bumper to an intermediate area of the blade located longitudinally between the blade root and the inner face, towards a free side edge of the platform, wherein the at least one bumper has a thinned portion:
which has an extension parallel to the longitudinal axis, which is at a distance from said free side edge, and
which has a thickness parallel to a direction which connects said leading edge and trailing edge, said thickness being thinner than a thickness of said at least one bumper, wherein said thickness of the at least one bumper is situated away from the thinned portion and towards the free side edge and parallel to said direction.

2. The blade of claim 1, wherein the thinned portion extends up to the connection to said intermediate area of the blade.

3. The blade of claim 1, wherein said intermediate area of the blade defines a stilt area for the blade, between the platform and the blade root.

4. The blade of claim 1, wherein:
the bumper has an upstream face oriented towards the leading edge and a downstream face oriented towards the trailing edge, and transversely to the longitudinal axis of the blade and to said direction connecting the leading edge and the trailing edge;
the thinned portion defines a recess in one of said faces, and,
the recess has a concave surface in several directions.

5. The blade of claim 1, wherein the at least one bumper has an upstream face oriented towards the leading edge and a downstream face oriented towards the trailing edge, with the thinned portion defining a recess in the upstream face.

6. The blade of claim 1, wherein:
towards said intermediate area of the blade, the platform bumper extends transversely to the longitudinal axis of the blade and to said direction connecting said leading and trailing edges,
on the inner face and parallel to said direction, the thickness of the thinned portion has a minimum,
between the inner and outer faces, the platform has a minimum thickness, and
the ratio of the minimum thickness of the platform to the minimum thickness of the thinned portion ranges from 0.5 to 1.5.

7. The blade of claim 1, wherein:
at a location between the connection to said intermediate area of the blade and a free side edge of the platform, and at a free end of the platform bumper, the thickness of the thinned portion has a maximum and the rest of the platform bumper has a maximum thickness, parallel to said direction connecting the leading and the trailing edges and,
said maximum thickness of the thinned portion ranges from 0.15 to 0.4 times the maximum thickness of the platform bumper.

8. The blade of claim 1, wherein, on the inner face, the thinned portion rises from the inner face to a free end of the platform bumper, parallel to the longitudinal axis.

9. The blade of claim 1, wherein, parallel to the longitudinal axis of the blade and substantially transversely to the direction in which the platform bumper extends from the connection to said intermediate area of the blade towards a free edge of the platform, the thinned portion has a thickness which decreases from the inner face to the free end of the bumper.

10. A turbomachine fan comprising a series of blades including the blade of claim 1.

* * * * *